United States Patent
Bunn et al.

(10) Patent No.: US 8,041,946 B2
(45) Date of Patent: Oct. 18, 2011

(54) DATA TRANSFER BETWEEN NETWORKS OPERATING AT DIFFERENT SECURITY LEVELS

(75) Inventors: Kelly S. Bunn, Duvall, WA (US); Daniel D. Schnackenberg, Auburn, WA (US); Janell Schnackenberg, legal representative, Auburn, WA (US)

(73) Assignee: The Boeing Company, Chicago, IL (US)

( * ) Notice: Subject to any disclaimer, the term of this patent is extended or adjusted under 35 U.S.C. 154(b) by 1069 days.

(21) Appl. No.: 11/365,718

(22) Filed: Feb. 28, 2006

(65) Prior Publication Data

US 2007/0204145 A1    Aug. 30, 2007

(51) Int. Cl.
 - *H04L 29/06* (2006.01)
 - *G06F 9/00* (2006.01)
 - *G06F 15/16* (2006.01)
 - *G06F 17/00* (2006.01)

(52) U.S. Cl. ........ 713/166; 713/164; 713/165; 713/151; 713/153; 713/154; 726/11; 726/12; 726/13; 726/14

(58) Field of Classification Search ............ 713/152, 713/153, 154, 150, 151, 168, 164, 166; 726/11, 726/12, 13, 22, 23, 24, 25, 2, 3, 14; 707/754
See application file for complete search history.

(56) References Cited

U.S. PATENT DOCUMENTS

| | | | |
|---|---|---|---|
| 5,586,260 A * | 12/1996 | Hu ................................. | 726/12 |
| 5,623,600 A | 4/1997 | Ji et al. | |
| 5,734,903 A * | 3/1998 | Saulpaugh et al. ........... | 719/316 |
| 5,884,025 A * | 3/1999 | Baehr et al. ...................... | 726/13 |
| 5,898,830 A * | 4/1999 | Wesinger et al. ............... | 726/15 |
| 5,903,732 A * | 5/1999 | Reed et al. ..................... | 709/229 |
| 6,104,716 A * | 8/2000 | Crichton et al. .............. | 370/401 |
| 6,272,639 B1 * | 8/2001 | Holden et al. .................. | 726/12 |
| 6,308,238 B1 * | 10/2001 | Smith et al. .................... | 710/310 |
| 6,584,508 B1 * | 6/2003 | Epstein et al. ................ | 709/229 |
| 6,604,143 B1 * | 8/2003 | Nagar et al. ................... | 709/229 |
| 2002/0112181 A1 * | 8/2002 | Smith ............................ | 713/201 |
| 2002/0162024 A1 * | 10/2002 | Cunchon et al. ............. | 713/201 |
| 2003/0120949 A1 * | 6/2003 | Redlich et al. ................ | 713/200 |
| 2004/0034769 A1 * | 2/2004 | Bacha et al. .................. | 713/153 |
| 2004/0098484 A1 * | 5/2004 | Wuebker ....................... | 709/227 |
| 2004/0111639 A1 * | 6/2004 | Schwartz et al. ............. | 713/201 |
| 2004/0230791 A1 * | 11/2004 | Boebert et al. ................ | 713/150 |
| 2005/0138110 A1 * | 6/2005 | Redlich et al. ................ | 709/201 |
| 2006/0248582 A1 * | 11/2006 | Panjwani et al. ............... | 726/13 |
| 2010/0192217 A1 * | 7/2010 | Arnold ............................ | 726/13 |

OTHER PUBLICATIONS

Gasser, M., "Building a Secure Computer System", Van Nostrand Reinhold, 1988, p. 89-91.*

Kang et al., "Design and Assurance Strategy for the NRL Pump," NRL Memo 5540-97-7991, Naval Research Laboratory, Washington, D.C., Dec. 1997.*

(Continued)

*Primary Examiner* — Eleni Shiferaw
*Assistant Examiner* — Hilary Branske
(74) *Attorney, Agent, or Firm* — Ostrager Chong Flaherty & Broitman P.C.

(57) ABSTRACT

A secure network server wherein both the forwarding process and the receiving process are created upon connection initialization, and the receiving process is held off from communicating with the source host until the forwarding process has created a connection with the destination host. This solves the problem of message loss when the destination host is unreachable.

14 Claims, 4 Drawing Sheets

OTHER PUBLICATIONS

Epstein, J., "Architecture and concepts of the ARGuE Guard," Computer Security Applications Conference, 1999. (ACSAC '99) Proceedings. 15th Annual, vol., No., pp. 45-54, 1999.*

Schnackenberg, "Development of a Multilevel Secure Local Area Network", from the proceedings of the 8th National Computer Security Conference on Sep. 30, 1985.*

* cited by examiner

DATA TRANSFER BETWEEN NETWORKS OPERATING AT DIFFERENT SECURITY LEVELS

BACKGROUND OF THE INVENTION

This invention relates to data transfer between networks operating at different security levels.

A known Secure Network Server (SNS) integrates networks and components operating at different security classification levels. In that known system, separate processes, called the receiving and forwarding processes, were respectively used to communicate with the source and destination hosts. These two processes were completely isolated from each other, with no backward flow of information. Messages received by the process communicating with the source host were forwarded to a trusted process that would dynamically spawn a process to communicate with the destination host for each message.

The foregoing approach has two drawbacks: (1) if the destination host were not available or crashes during the transfer, the source host will never know, and may act as if the messages had been reliably delivered; and (2) the creation of the forwarding process for each message and passing the messages through an intermediate trusted process reduces message throughput.

There is a need to develop an architecture, design and implementation that improves the reliability of data transfer between networks.

BRIEF DESCRIPTION OF THE INVENTION

The invention is directed to a secure network server wherein both the forwarding process and the receiving process are created upon connection initialization, and the receiving process is held off from communicating with the source host until the forwarding process has created a connection with the destination host. This solves the problem of message loss when the destination host is unreachable.

More specifically, one aspect of the invention is a secure network server for transferring data between networks operating at different security levels, said server being programmed to perform the following steps: (a) establishing a connection with a source host having a first security level; (b) creating a receiving process and a forwarding process in response to initiation of said connection; (c) subsequent to step (b), establishing a connection between said forwarding process and a destination host, said destination host having a second security level different than said first security level; (d) sending a message from said forwarding process to said receiving process indicating that said connection between said forwarding process and said destination host has been established; (e) establishing a connection between said receiving process and said source host; (f) transmitting data from said source host to said receiving process only if said message was received by said receiving process; (g) storing the transmitted data in a file having a file name; (h) changing security data in said file to said second security level; and (i) said forwarding process reading the data from said changed file and forwarding the read data to said destination host.

The foregoing solution allows the forwarding process to signal abort conditions to the receiving process when the destination host sends a reset message or becomes unreachable (e.g., crashes or loses network connectivity). The abort signal enables the receiving process to send a reset message to the source host to signal the end of the connection and abnormal connection termination. This notifies the source host of potential loss of data, which cannot be avoided under these conditions.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
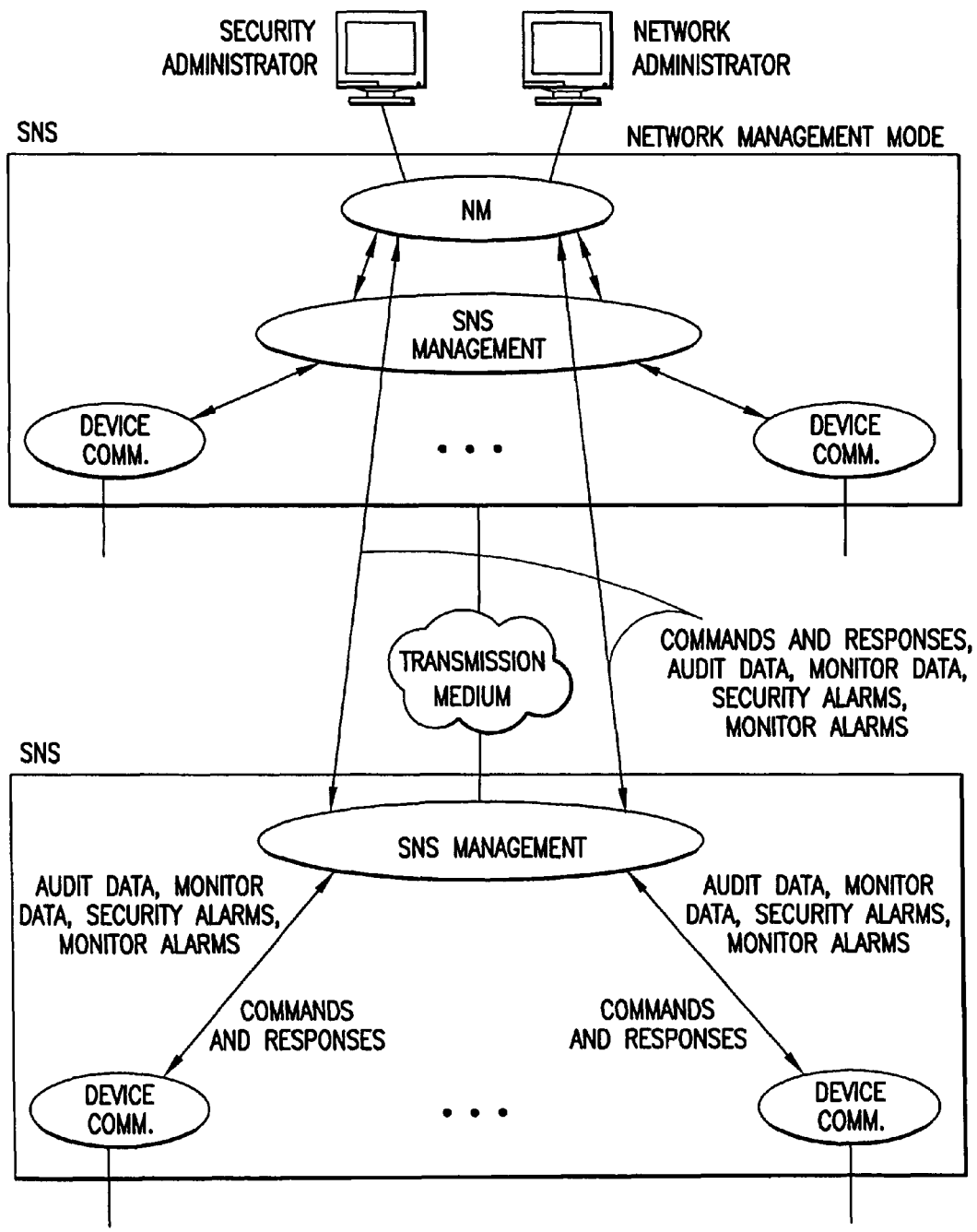
FIG. 1 is a diagram showing the data flow in an SNS system having hierarchical management.

The Secure Network Server (SNS) disclosed herein is a multilevel secure (MLS) Internet Protocol (IP) filtering router, with firewall/guard capabilities, supporting standard protocols, including Transmission Control Protocol (TCP), User Datagram Protocol (UDP), IP Control Message Protocol (ICMP), and Simple Mail Transfer Protocol (SMTP).

The SNS provides users the capability to securely interconnect different security domains. The SNS serves as a filtering router, with the capability to support reliable upgrade, and filtered downgrade of data between security domains. The SNS supports both single-level and multilevel subscriber devices and networks. More specifically, the SNS provides the following subscriber device services: (a) support for unlabeled single-level interfaces through standard IP protocol; (b) support for multilevel interfaces through the Common IP Security Option (CIPSO) labeling standard; (c) IP packet filtering, with filtering rules based on IP protocol, IP source address and mask, IP destination address and mask, TCP/UDP source and destination ports, and ICMP types; (d) routing IP multicast to multiple destinations; (e) e-mail, generic TCP, and simple message transfer protocol proxies, enabling reliable upgrade and filtered downgrade of data; and (f) generic filtering capability for fixed format messages, email and XML messages. Filtering rules are defined in a file downloaded to the SNS.

The SNS provides the following network management (NM) services: (a) control of one or more SNSs through a single network management node; (b) support for "warm spare" approach to fail-over of the network management node; (c) administrative control of SNS security and networking features through a command line interface; (d) review of network audit and monitor trails through the command line interface; (e) real-time streaming of SNS audit data to an attached audit server; (f) separation of duty between security and network administration of the system; and (g) SNS control.

The SNS in accordance with the disclosed embodiment connects to subscriber devices using standard Ethernet operating at 10/100 Mbps, plus Gbps Ethernet. A system of SNSs comprises multiple chasses interconnected through a private inter-SNS trunk (indicated in FIG. 1 by the cloud labeled "TRANSMISSION MEDIUM"). One of the SNSs is designated as the current NM node. Alternate NM nodes can be used, but only one can be active at a time.

At the network layer, the SNS in accordance with the disclosed embodiment supports standard IP and ICMP. The SNS routing mechanisms support both unicast and multicast IP. For multicast IP, the SNS enables users to enter multicast delivery through one or more SNSs to multiple networks or devices.

At the transport level, the SNS in accordance with the disclosed embodiment can route any protocol that resides atop IP. In particular, the SNS provides proxies for TCP-based applications, enabling reliable upgrade and downgrade for these applications. The SNS in accordance with the disclosed embodiment provides three application proxies: SMTP, TCP, and a simple message transfer protocol. All three provide reliable upgrade. The SNS in accordance with the disclosed embodiment also provides content filtering for both upgrade and downgrade of messages. The SMTP proxy enables filtering based on e-mail addresses. Content filters for e-mail, TCP and the simple message transfer protocol are defined using an offline Java-based tool. Constraints can be defined for e-mail, fixed format binary messages or XML messages. Constraints include range validation for numeric fields, validation against a specified list of alternatives for any field, and dirty word filtering for text fields. The filters can be configured to either alter or remove some message fields. Messages that fail to meet the criteria specified are logged and discarded.

The SNS in accordance with the disclosed embodiment uses a distributed NM approach, with a centralized NM node providing system-level monitoring and control, and distributed NM software in the SNSs providing local management support. Any SNS can serve as the central NM node. Multiple NM nodes are supported, provided they have compatible configuration databases. Only one NM node can be active at a time. An NM node is made active through a single command at the network administrator console. The SNS in active NM mode uses its private inter-SNS trunk to manage the other SNSs.

In addition to the NM node, the SNS provides an optional audit server interface, enabling audit and monitor data to be transferred in real-time to an attached device.

The NM central node provides a command line interface that separates the security and network administrative functions. NM also provides a utility console that can be used for backup and recovery of the system configuration, as well as archive of the system audit and monitor trails. The command line interface is part of the trusted functionality (i.e., NTCB) of the SNS that is programmed to operate in a network management mode.

The network administrative functions include the following: (a) SNS control, including initialization, shut down, and restart of subscriber device interfaces, SNSs, the NM interface, and the full SNS system; (b) SNS performance management; (c) SNS configuration management, including specification of device-to-SNS connectivity and IP filtering rules; (d) SNS monitoring, including collection, storage, and display of SNS status and performance statistics; and (e) SNS time, including initialization and distribution of SNS time to all SNS nodes in the SNS.

The security administrative functions include the following: (a) security control, including shutdown and restart of subscriber device interfaces, SNSs, and the full SNS system; (b) security configuration management, including establishment and maintenance of a database of user privileges, device sensitivity ranges, and other SNS security parameters; (c) security monitoring, including collection, storage, and display of security audit data, and generation of real-time security alarms; (d) user authentication support, including establishment and maintenance of a database of user identities and passwords, as well as other user data; and (e) translation between logical sensitivity level names and the SNS internal format.

The SNS in accordance with the disclosed embodiment also enables web-based configuration of filter control files. This capability is controlled through the security administrator interface. Administrative personnel use a standard web browser to download to the SNS filter control files. The control files must be approved for use through the command line interface to prevent malicious insertion of rule changes.

The SNS network in accordance with the disclosed embodiment comprises a network trusted computing base (NTCB), which is designed to act as a reference monitor for network resources. The reference monitor requirements are that it be of minimal complexity, always invoked on object access, and tamper-proof.

One objective of the SNS is to provide sufficient protection mechanisms to provide host-specified session separation. This implies that the network must provide a trusted path, as well as ensure that process-to-process communication between host processes meets the mandatory and discretionary access control policies specified in the TNI.

An SNS in accordance with the disclosed embodiment provides network security functions for host-to-host connections, and datagram services (IP). Proxied host-to-host connection-oriented communication is provided using TCP, SMTP over TCP or a simple messaging service over TCP. This includes ensuring that data is not sent (or received) at a sensitivity level other than what is permitted for a sender (or receiver). Each SNS proxied connection operates at a single sensitivity level; however, the network supports multiple connections or sessions at different sensitivity levels.

All devices (hosts, workstations) attached to the network have associated maximum and minimum sensitivity levels. The minimum must be at or below the maximum. If the host is single-level, the maximum sensitivity level is the same as the minimum sensitivity level. Other devices are single-level, but may operate at multiple sensitivity levels within their range. The device user controls this. The host is responsible for ensuring that users can only operate at sensitivity levels for which they are cleared.

In accordance with the disclosed embodiment, hosts or remote networks that use IP may be connected to an SNS over an IEEE 802.3 interface. IP interfaces may be configured as one of (1) IP host, (2) IP router, or (3) audit server. IP hosts and routers are provided standard IP service, and can be configured as either multilevel or single-level. Single-level IP hosts and routers may be configured to be either labeled or unlabeled. Audit server hosts are only allowed to receive data from the SNS, and are delivered, using standard UDP/IP, SNS audit and monitor data and alarms.

FIG. 1 illustrates the internal SNS design in accordance with the disclosed embodiment. The ovals represent tasks and task groups while rectangles represent functional components, subsystems or hardware.

The NM node provides central management of the SNS system, including security administrator (SA) and network administrator (NA) interfaces to control the status of all network components. Each SNS has a central manager ("SNS MANAGEMENT" in FIG. 1) providing direct support for network startup, component shutdown and restart, and monitor and audit data collection. Startup, shutdown, and restart commands from network management (NM) are sent to the SNS central manager and then to the device communications task groups ("DEVICE COMM." in FIG. 1). Responses to NM commands and audit data are collected by the SNS central manager from the device communications task groups and forwarded to NM.

In accordance with the disclosed embodiment, write-up from a lower-level host to a higher-level host is achieved with two degrees of reliability. In order of increasing reliability, the two write-up methods are (a) IP and UDP; and (b) application proxies over TCP. Application proxies support SMTP, TCP, or a simple message transfer protocol. IP and UDP are datagram services that do not use acknowledgments and are only as reliable as the link hardware, transmission medium, and each component's ability to keep up with the incoming data.

Figure 2:
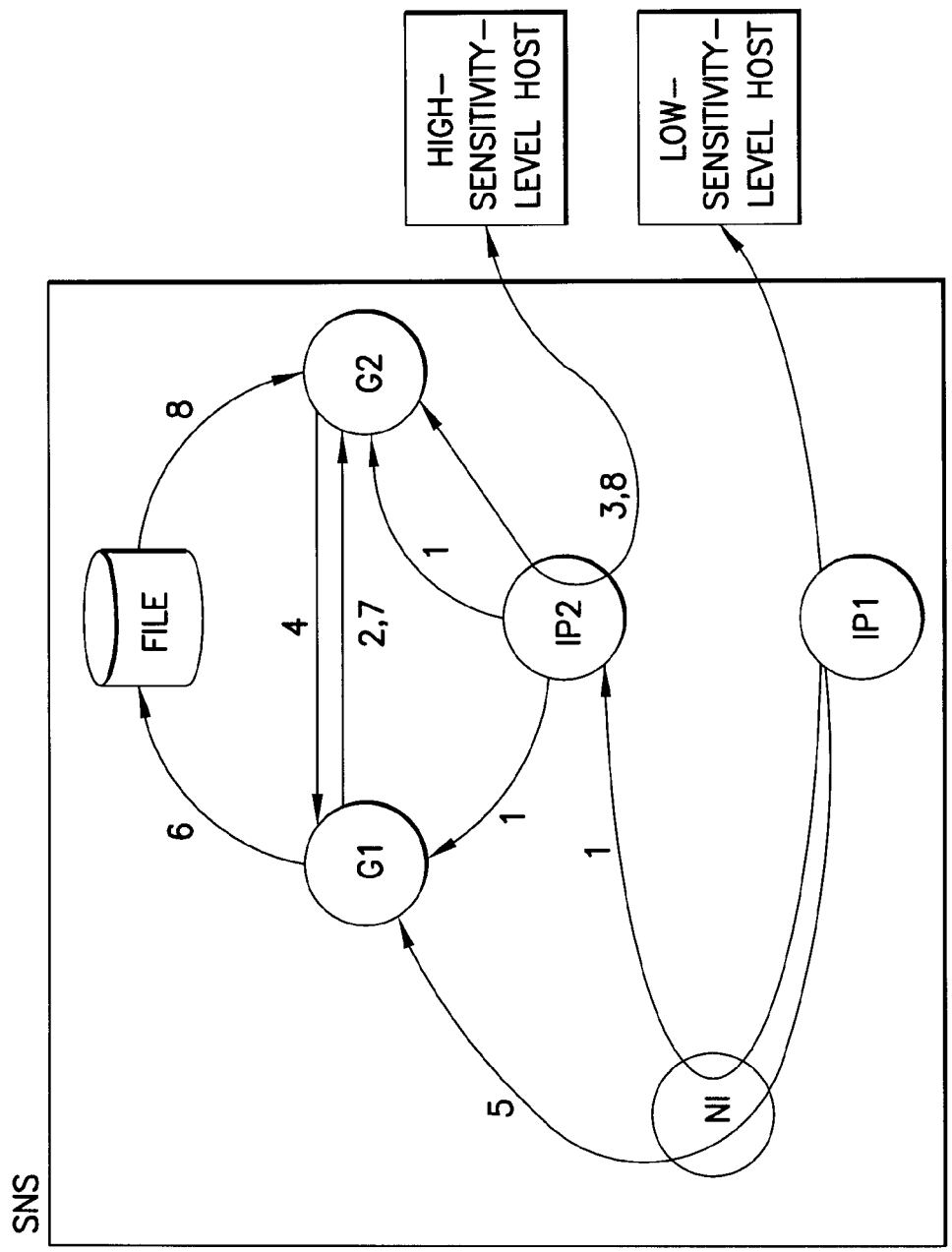
FIG. 2 is a diagram showing a TCP session established in an SNS for proxy write-up from a lower-sensitivity-level host to a higher-sensitivity-level host.

TCP sessions may be established to a host attached to a proxy gateway interface that is operating at a different sensitivity level than the source. The purpose of this capability is to enable reliable data transfer from a source at a lower sensitivity level host to a destination host at a higher sensitivity level. FIG. 2 shows how these sessions are established through the SNS. The source host must initiate the connection and specify the connection sensitivity level. The sensitivity level specified by the source host must be within its sensitivity level range. The destination host must be authorized to participate in write-up connections. The SA grants and revokes this authorization. The connection establishment and data transfer occurs in the following steps:

(1) On initiation of the connection, the SNS creates both task groups needed for the upgrade (G1 and G2 in FIG. 2).

(2) Task Group G1 sends a message to Task Group G2 to let the latter know that Task Group G1 has been created and Task Group G2 can complete the connection.

(3) Task Group G2 establishes the TCP connection with the destination host via IP interface task group IP2.

(4) Task Group G2 then sends a message (e.g., a binary value) to Task Group G1 that indicates that the TCP connection with the destination host has been established.

(5) In response to receipt of the message indicating that the TCP connection with the destination host has been established by Task Group G2, Task Group G1 then completes TCP connection establishment with the source host via network interface task group NI and IP interface task group IP1. In a typical write-up connection, the source host then begins transmitting data.

(6) The Task Group G1 executes the proxy protocol with the source host and stores the message locally in the SNS file system ("FILE" in FIG. 2).

(7) Once the message transfer is complete, Task Group G1 forwards the message to Task Group G2.

(8) Task Group G2 reads the data from the file and executes the proxy protocol with the target host to forward the data to the destination host via IP interface task group IP2.

For the connection to be established as a write-up connection, the following must be true: (a) The sensitivity level specified by the source host must be dominated by the destination host's maximum sensitivity level. (2) The destination host must be authorized to establish this connection type (i.e., the destination host must have write-up privilege, which is granted by the network SA) for the write-up to occur.

The SNS also enables filtering of upgrade messages. The process is similar to that described above, however, the SNS also creates a third, NTCB, task group that is inserted between Task Groups G1 and G2 in FIG. 2. That third task group receives messages from Task Group G1 and forwards validated messages to Task Group G2 for forwarding to the host. The process for establishing the connection and transferring data is the same as that used for downgrade proxies, described hereinafter.

The SNS provides filtering of connections from high to low. The process is similar to that described above; however, for downgrade, there must be a filter task group for the outbound interface. For upgrade the filter is optional. The SA controls downgrade through multiple mechanisms: (a) The sensitivity level specified by the source host must be dominated by the destination host's maximum downgrade sensitivity level. (b) The outbound interface must be designated by the SA as a downgrade interface. (c) The SA must specify which proxy type and filter type is to be used at the outbound interface based on the TCP port number. (d) The SA must specify support files used by the filter.

Figure 3:
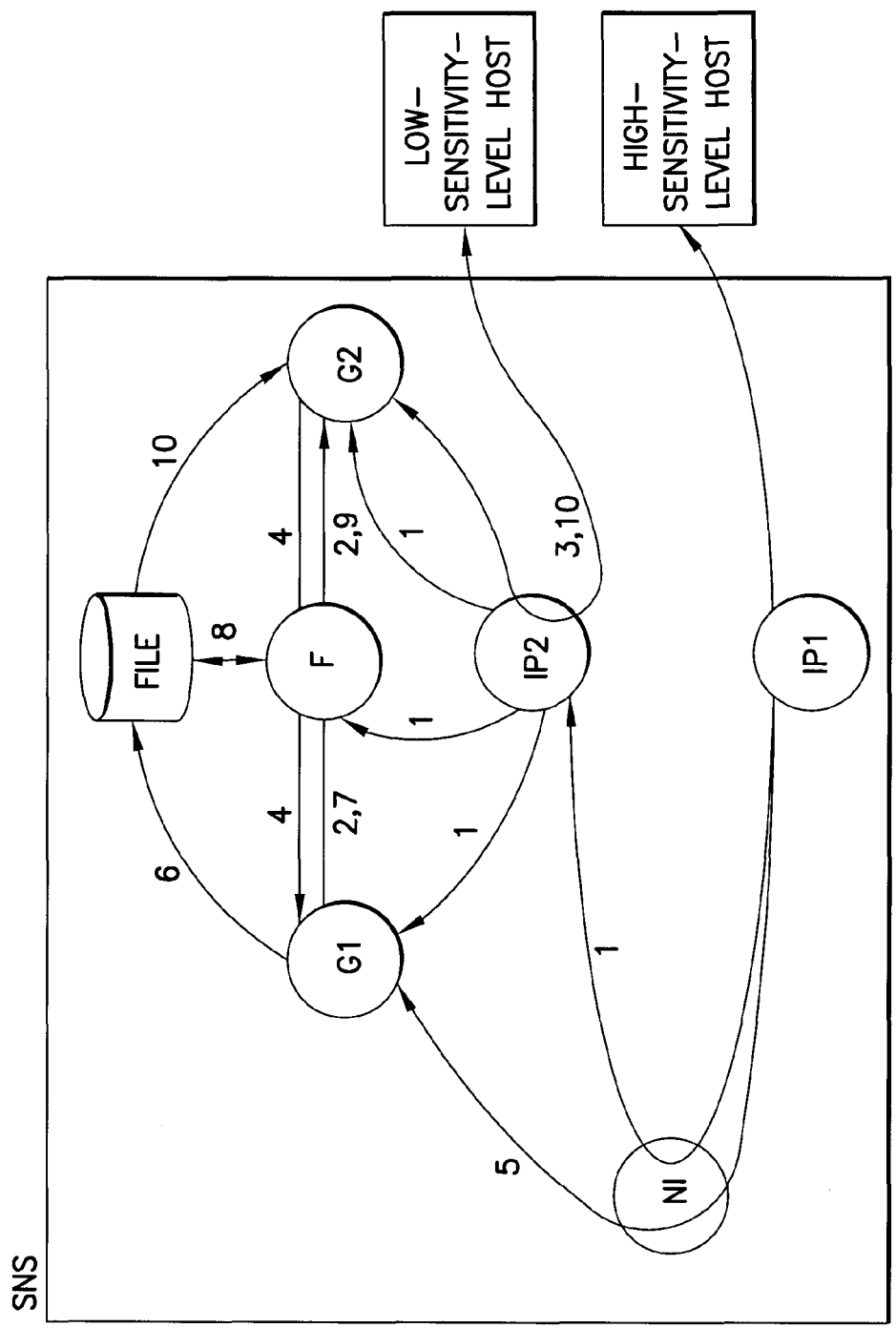
FIG. 3 is a diagram showing a TCP session established in an SNS for proxy downgrade from a higher-sensitivity-level host to a lower-sensitivity-level host.

The major differences from the above process is that in step 1, the SNS also creates a third, NTCB filter task group that is inserted between Task Groups G1 and G2 in FIG. 3. The initialization and reception of messages by Task Group G1 (steps 1-6) is the same for upgrade and downgrade; however, in step 7, where Task Group G1 forwards data, Task Group G1 sends the data to Task Group F instead, as shown in FIG. 3. The subsequent steps are as follows:

(7) The filter task group F receives the data from Task Group G1.

(8) The filter task group F filters the data based on the rule set specified by the SA.

(9) On success, the filter task group F forwards the data for validated messages to Task Group G2 for forwarding to the host.

(10) Task Group G21 reads the data from the file and executes the proxy protocol with the target host to forward the data to the destination host via IP interface task group IP2.

Note that the process for downgrade filtering is identical to that for upgrade filtering. The SNS has a standard set of proxies and a standard filter. The filter is controlled by a file that specifies the filtering rules for the port number for a specific interface.

Custom proxies and filters can be added to the SNS, but require additional software to be integrated into the system. Such proxies and filters use a standard framework, so that their operation is identical to what is described above. New proxies require no modification to the core algorithms in the SNS, just changes to the command language to allow specification of the new proxy. Filters are part of the NTCB, and so integrating a new filter is a more significant change to the SNS.

In accordance with the above-described embodiment, both the forwarding process and the receiving process are created upon connection initialization, and the receiving process is held off from communicating with the source host until the forwarding process has created a connection with the destination host. This solves the problem of message loss when the destination host is unreachable.

Figure 4:
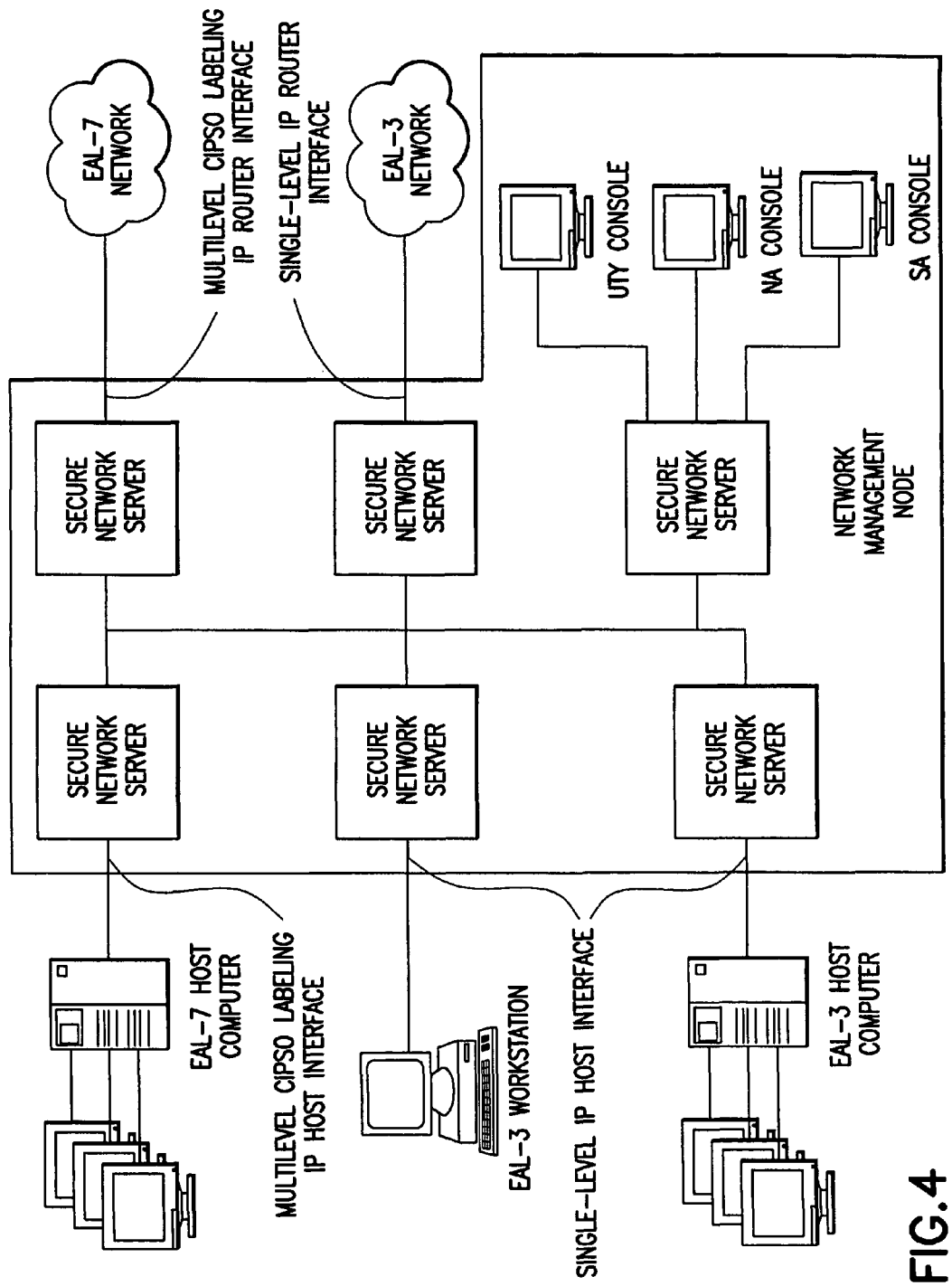
FIG. 4 is a block diagram showing an exemplary SNS configuration.

Hereinafter, how to configure and interconnect automated information system components to construct a distributed system, using SNSs to connect the components, and achieve a desired level of system assurance, will be described. Requirements to maintain a high level of system assurance using SNSs to interconnect system devices are presented, including necessary device characteristics and SA actions. FIG. 4 presents an exemplary EAL-7 configuration.

An SNS supports hosts through an IP host or IP router interface. As seen in the exemplary SNS configuration depicted in FIG. 4, a multiplicity of secure network servers (SNSs), including a Network Management Node SNS, are interconnected via a network. The SNS shown in the upper row and on the right-hand side of the configuration is connected to a network having an Evaluation Assurance Level of EAL-7 by way of a multilevel CIPSO labeling IP router interface. The SNS shown in the upper row and on the left-hand side of the configuration is connected to a host computer having an Evaluation Assurance Level of EAL-7 by way of a multilevel CIPSO labeling IP host interface. The SNS shown in the middle row and on the right-hand side of the configuration is connected to a network having an Evaluation Assurance Level of EAL-3 by way of a single-level IP router interface. The SNS shown in the middle row and on the left-hand side of the configuration is connected to a workstation having an Evaluation Assurance Level of EAL-3 by way of a single-level IP host interface. The SNS shown in the lower row and on the left-hand side of the configuration is connected to a host computer having an Evaluation Assurance Level of EAL-3 by way of a single-level IP host interface. The network management node SNS can be accessed by an authorized user via a security administrator (SA) console, a network administrator (NA) console and a utility (UTY) console. Each host attached to the SNS must provide the authentication mechanisms, discretionary access enforcement, and audit mechanisms necessary to meet the system-level requirements. Hosts attached to the SNS through an MLS interface (i.e., the interface's maximum and minimum sensitivity levels are not the same) must also provide mandatory access controls. The assurance level for such MLS hosts must also meet the system-level assurance requirements. That is, if an MLS attached host is rated as EAL-N, where N is a positive integer, then the system provides EAL-N assurance for the range of sensitivity levels assigned to that host by the system SA.

If all SNS interfaces to a host (IP) are configured to operate at the same sensitivity level, then the host is single-level from the point of view of the network. A network of single-level hosts, connected through a system of SNSs, results in a system that has EAL-7 assurance.

There are two possible scenarios that make a host's interface to the SNS multilevel: (a) more than one single-level interface, where two of the interfaces are configured to operate at different sensitivity levels; and (2) an IP interface configured to operate at multiple sensitivity levels. In both cases, the host must meet the system-level assurance requirements. Connecting lower assurance multilevel hosts through the SNS results in a system where the system-level assurance is reduced to that of the lowest assurance MLS host. However, if the hosts are constrained by the SNS to small sensitivity ranges, the security risk can be reduced.

For IP interfaces, the host's range of sensitivity levels assigned by the SA must be consistent with the sensitivity levels assigned by the host administrator to the host's side of the interface.

In accordance with the disclosed embodiment, the SNS supports management of SNS filtering rule sets from remote hosts. The SA controls which interface can be used for this capability by setting the "Trusted Configuration Server" control for the management interface. The SNS enables use of a standard web browser to support this feature, plus a custom Java tool for creating SNS filtering rule sets. The SNS provides safeguards against compromise through this interface. Besides limiting which host interfaces can use this mechanism, the SNS validates all input to ensure that it is valid and consistent filtering rules, and requires review by the system SA before accepting the filtering rule set file into the system.

Administrators use the Java-based tool to define filtering rule sets. These rule sets are downloaded to the SNS over HTTP. To support low-assurance hosts performing this management function and to minimize the complexity of the SNS's NTCB, the HTTP web server on the SNS operates as a non-NTCB task group.

Tasks are the principal active entities managed by the executive; however, task groups form the unit of encapsulation provided by the executive. Task groups are either NTCB or non-NTCB. The executive enforces a policy of complete separation of non-NTCB task groups. The executive keeps track of which tasks belong to each task group, and ensures that non-NTCB task groups do not share data or even communicate.

The security and networking features of each SNS can be configured using an HTTP web server task group (non-NTCB) embedded in the network management SNS. This web server is accessible to administrators through a standard web browser on a computer that connects to the network management SNS via a network. The configuration of an SNS can be modified by downloading modified configuration data from the web browser on the remote computer to the web server on the network management SNS via the HTTP interface. These changes in SNS configuration are reviewed and accepted using a command line interface that is part of the trusted security functionality of the network management SNS. This allows the web server to be outside the SNS's trusted security functionality.

In the disclosed embodiment, the HTTP web server within the network management SNS is a standard SNS proxy process that is created when an HTTP session is created with the network management SNS's router address as the target host. The SNS security administrator controls this feature by setting a configuration flag for each Ethernet interface that is used as an IP router interface. If the configuration flag is not set, the interface will not allow the web server to be created.

Upon creation, the web server uses a trusted process in the network management SNS to read the SNS configuration data and present forms to the administrative user over HTTP. The administrator uses a standard HTTP web browser at a remote computer to enter data in the forms and submit the data to the network management SNS. The web server uses the same trusted process to place the modified configuration data into temporary storage for review by administrators using the command line interface of the network management SNS. After both network and security administrator review of the changes, the changes are accepted into the SNS for use. This approach can be used for most SNS configuration parameters. Secure Sockets Layer (SSL) and other security mechanisms (e.g., user authentication) can be used to provide additional security across the Ethernet interface from the SNS to the client web browser, although none of these mechanisms is required to ensure that the data entered is correct configuration data.

The executive does not associate sensitivity levels with tasks, however, the session manager that creates a single-level task group records that task group's sensitivity level. The executive does not require any information about sensitivity levels, because the policy enforced by the executive is one of complete separation and is not based on the sensitivity levels of the tasks. All non-NTCB tasks within a task group operate at the same sensitivity level. When a task has access to a data segment in memory, it has both read and write access. Thus the sensitivity level of the data segments to which a non-NTCB task has access is the same as the task's sensitivity level. NTCB tasks have no sensitivity level. They typically provide services that require operation at multiple sensitivity levels. All the NTCB tasks are verified to operate securely.

TCP call gates are provided for filter and application proxy task groups to initialize, send data to and receive data from the network, send files between proxies, and send error reports to the IP Interface task group. TCP call gates are called by proxy task groups and use the executive.

A file system separates a disk into NM and user partitions. This separation provides a mechanism that prevents NM from having to compete with user task groups for resources.

A file mover task group is used by the web server task group to move files between the NM and user partitions. The web server task group enables download of filter rule set files. The file mover task group receives file names from the web server through an executive mailbox. The file mover task group copies a file from the user partition to a temporary directory in the NM partition. Files in the temporary directory in the NM partition are ready for review by the SA before the file can be used in configuring proxies. The file mover software interfaces with web server (via executive), executive, and IP interface software. The file mover task group is part of the trusted security functionality, while the web server task group is part of the non-trusted security functionality of the SNS.

A generic filter process provides filtering for messages received in the SNS through non-NTCB proxies. The generic filter can filter e-mail, XML messages or fixed format messages. Filtering is controlled by a message filter task group file that specifies filtering rules. Filter task group files are assigned to the filter in the proxy table setup by the SA when adding proxies. Separate filter task group files can be specified for separate proxy specifications. The filter task group file specifies rules for message fields. For e-mail and XML messages, fields are defined by tags. For fixed format messages, fields are defined by offset into the message. Filter rules include type-dependent filters. For number types, range and discrete value checks can be specified. For text fields, discrete values or dirty word searches can be specified. Actions can be specified that enable discarding the message, stripping out a field for e-mail or XML messages, replacing a field for e-mail or XML messages, or zeroing a field for fixed format messages.

The filter rules can be specific to the source IP address for the sender of the message. The filter task group file format allows specification of source address and mask for a set of rules. This enables source or interface specific filtering rules. The filter task groups interface with the IP software, TCP gates, proxy task groups (via TCP gates), and executive.

Custom filters can be added to the SNS using a filter development framework. The framework provides the initialization and termination software, so that only a filtering 'c' program is needed to provide filtering capabilities. Custom filters are used when the generic filter does not provide sufficient functionality. Custom filters alter the NTCB, so their use should be minimized. However, the changes are localized to just the filtering algorithm, which reduces the security risk. The custom filter task groups interface with the IP software, TCP gates, proxy task groups (via TCP gates), and executive.

Proxy task groups support a protocol for transfer of data through the SNS. The SNS in accordance with the disclosed embodiment has the following types of proxies: (a) TCP; (b) SMTP; and (c) message transfer protocol. The TCP proxy task group forwards TCP segments through the SNS. The SMTP proxy task group provides the standard SMTP protocol for the IP interface. SMTP messages are forwarded through the SNS.

The SNS disclosed herein is a high-assurance, multi-level security (MLS) network guard that enables information sharing across network boundaries, while enforcing established security and policy rules. The SNS allows: interconnection of single-level networks, hosts, and workstations that operate at different levels; connection of single-level networks, hosts, and workstations into a multilevel network; separation of multi-level components that have different accreditation ranges; routing of data between multilevel and single-level networks; one-way transfer of data from a lower security enclave to higher security level workstations, hosts, or networks; movement of e-mail between multiple security levels consistent with security and policy rules as an e-mail firewall; one-way transfer of data from a higher security enclave to lower security level workstations, hosts, or networks based on a predefined downgrade rule set; information upgrade to a higher domain; and message downgrade and release to a lower domain, subject to downgrade filter rules.

The SNS, configured as a high-assurance guard, can be used to exchange information between enclaves at different security classification levels. Public information from external, unclassified networks can be transmitted securely into classified networks without compromising sensitive or classified information. A two-stage proxy scheme is used within the SNS to ensure that unclassified information is transferred into the SNS and then upgraded to a classification level appropriate to the target network.

This approach prevents any sensitive or classified information from being exposed to the unclassified network by breaking the transaction into a "low" process and a "high" process within the SNS. In this way, the results from processes running on unclassified systems could be safely used as input to other processes running on classified systems. For example, real-time weather forecasts could be pulled from public sources and pushed into highly sensitive networks for use in operational planning.

Automated downgrade techniques can be implemented within the SNS to facilitate communications from a "high" network to a "low" network by adding approved filters to this two-stage proxy technique. In this way, a preauthorized set of messages could be sent from a classified system to the external, unclassified simulations (e.g., situation reports, 'start,' 'pause,' and 'stop' commands, etc.) or approved information could be downgraded from a classified system for use in an unclassified network.

The SNS supports both single-level and multi-level interfaces. Security labels are added and deleted from network traffic, as needed, by using the industry standard Commercial Internet Protocol Security Options (CIPSO) field in the IP header. These CIPSO labels support both hierarchical security classification domains and non-hierarchical "need-to-know" compartments. This approach supports current single-level networks as well as networks containing MLS or compartmented workstations.

Single-level data read into the SNS is tagged internally to the SNS using the CIPSO labels. The label assigned is that of the interface that the data came from. As the data moves through the SNS, the label is revised as appropriate. Assuming the receiving host is single level, then the tag is stripped off by the SNS prior to the data being transmitted to the receiving host. However, if the receiving host has multilevel security, then the CIPSO labels can be retained.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of transferring data between networks operating at different security levels, comprising the following steps:
(a) establishing a session inside a secure network server in response to initiation of a connection of a source host to said secure network server, said source host being located outside said secure network server and having a first security level, and said establishing a session comprising creating a receiving task group and creating a forwarding task group;
(b) subsequent to step (a), attempting to establish a connection between said forwarding task group and a destination host, said destination host being located outside said secure network server and having a second security level different than said first security level;
(c) subsequent to step (b), sending a message from said forwarding task group to said receiving task group indicating whether or not said connection between said forwarding task group and said destination host has been established;
(d) in response to receipt of a message from said forwarding task group indicating that said connection between said forwarding task group and said destination host has been established, establishing a connection between said receiving task group and said source host that allows said receiving task group to receive data transmitted by said source host;
(e) subsequent to receipt of said transmitted data from said source host, storing said transmitted data in a memory, said transmitted data being stored in a file having a file name;
(f) subsequent to step (e), changing security data in said file to said second security level;
(g) subsequent to step (e), sending a message from said receiving task group to said forwarding task group, said message including said file name; and
(h) subsequent to steps (f) and (g), said forwarding task group reads the data from said changed file and forwards the read data to said destination host,
wherein said connection between said receiving task group and said source host and said connection between said forwarding task group and said destination host are made at the transport level, said receiving task group executes a proxy protocol with said source host, and said forwarding task group executes a proxy protocol with said destination host.

2. The method as recited in claim 1, wherein the security level of said source host is less than the security level of said destination host.

3. The method as recited in claim 1, wherein the security level of said source host is greater than the security level of said destination host.

4. The method as recited in claim 1, further comprising the following step performed subsequent to step (a) and prior to step (b): sending a message from said receiving task group to said forwarding task group indicating that said receiving task group has been created.

5. The method as recited in claim 1, wherein in response to receipt of a message from said forwarding task group indicating that said connection between said forwarding task group and said destination host has not been established, said receiving task group will not establish a connection with said source host.

6. A secure network server system for transferring data between networks operating at different security levels, said secure network server system being programmed to perform the following steps:
(a) establishing a session inside said secure network server in response to initiation of a connection of a source host to a secure network server, said source host being located outside said secure network server and having a first security level, and said establishing a session comprising creating a receiving task group and creating a forwarding task group;
(b) subsequent to step (a), establishing a connection between said forwarding task group and a destination host, said destination host being located outside said secure network server and having a second security level different than said first security level;
(c) subsequent to step (b), sending a message from said forwarding task group to said receiving task group indicating whether or not said connection between said forwarding task group and said destination host has been established;
(d) in response to receipt of a message from said forwarding task group indicating that said connection between said forwarding task group and said destination host has been established, establishing a connection between said receiving task group and said source host that allows said receiving task group to receive data transmitted by said source host;
(e) subsequent to receipt of said transmitted data from said source host, storing said transmitted data in a memory, said transmitted data being stored in a file having a file name;
(f) subsequent to step (e), changing security data in said file to said second security level;
(g) subsequent to step (e), sending a message from said receiving task group to said forwarding task group, said message including said file name; and
(h) subsequent to steps (f) and (g), said forwarding task group reads the data from said changed file and forwards the read data to said destination host,
wherein said connection between said receiving task group and said source host and said connection between said forwarding task group and said destination host are made at the transport level, said receiving task group executes a proxy protocol with said source host, and said forwarding task group executes a proxy protocol with said destination host.

7. The secure network server system as recited in claim 6, said secure network server system being further programmed to perform the following step subsequent to step (a) and prior to step (b): sending a message from said receiving task group to said forwarding task group indicating that said receiving task group has been created.

8. The secure network server system as recited in claim 6, wherein in response to receipt of a message from said forwarding task group indicating that said connection between said forwarding task group and said destination host has not been established, said receiving task group will not establish a connection with said source host.

9. A method of transferring data between networks operating at different security levels, comprising the following steps:
(a) establishing a session inside a secure network server in response to initiation of a connection of a source host to said secure network server, said source host being located outside said secure network server and having a first security level, and said establishing a session comprising creating a receiving task group, creating a forwarding task group and creating a filtering task group;

(b) subsequent to step (a), attempting to establish a connection between said forwarding task group and a destination host, said destination host being located outside said secure network server and having a second security level different than said first security level;

(c) subsequent to step (b), sending a message from said forwarding task group to said receiving task group indicating whether or not said connection between said forwarding task group and said destination host has been established;

(d) in response to receipt of a message from said forwarding task group indicating that said connection between said forwarding task group and said destination host has been established, establishing a connection between said receiving task group and said source host that allows said receiving task group to receive data transmitted by said source host;

(e) subsequent to receipt of said transmitted data from said source host, forwarding said transmitted data from said receiving task group to said filtering task group;

(f) subsequent to receipt of said transmitted data from said receiving task group, said filtering task group filters said transmitted data in accordance with a specified rule set;

(g) subsequent to filtering of said transmitted data, said filtering task group stores said filtered data in a memory, said filtered data being stored in a file having a file name;

(h) subsequent to step (g), changing security data in said file to said second security level;

(i) subsequent to step (g), sending a message from said filtering task group to said forwarding task group, said message including said file name; and (j) subsequent to steps (h) and (i), said forwarding task group reads the data from said changed file and forwards the read data to said destination host, wherein said connection between said receiving task group and said source host and said connection between said forwarding task group and said destination host are made at the transport level, said receiving task group executes a proxy protocol with said source host, and said forwarding task group executes a proxy protocol with said destination host.

10. The method as recited in claim 9, further comprising the following step performed subsequent to step (a) and prior to step (b): sending a message from said receiving task group to said forwarding task group indicating that said receiving task group has been created.

11. The method as recited in claim 9, wherein in response to receipt of a message from said forwarding task group indicating that said connection between said forwarding task group and said destination host has not been established, said receiving task group will not establish a connection with said source host.

12. A secure network server system for transferring data between networks operating at different security levels, said secure network server system being programmed to perform the following steps:

(a) establishing a session inside said secure network server in response to initiation of a connection of a source host to a secure network server, said source host being located outside said secure network server and having a first security level, and said establishing a session comprising creating a receiving task group, creating a forwarding task group and creating a filtering task group;

(b) subsequent to step (a), attempting to establish a connection between said forwarding task group and a destination host, said destination host being located outside said secure network server and having a second security level different than said first security level;

(c) subsequent to step (b), sending a message from said forwarding task group to said receiving task group indicating whether or not said connection between said forwarding task group and said destination host has been established;

(d) in response to receipt of a message from said forwarding task group indicating that said connection between said forwarding task group and said destination host has been established, establishing a connection between said receiving task group and said source host that allows said receiving task group to receive data transmitted by said source host;

(e) subsequent to receipt of said transmitted data from said source host, forwarding said transmitted data from said receiving task group to said filtering task group;

(f) subsequent to receipt of said transmitted data from said receiving task group, said filtering task group filters said transmitted data in accordance with a specified rule set;

(g) subsequent to filtering of said transmitted data, said filtering task group stores said filtered data in a memory, said filtered data being stored in a file having a file name;

(h) subsequent to step (g), changing security data in said file to said second security level;

(i) subsequent to step (g), sending a message from said filtering task group to said forwarding task group, said message including said file name; and (j) subsequent to steps (h) and (i), said forwarding task group reads the data from said changed file and forwards the read data to said destination host, wherein said connection between said receiving task group and said source host and said connection between said forwarding task group and said destination host are made at the transport level, said receiving task group executes a proxy protocol with said source host, and said forwarding task group executes a proxy protocol with said destination host.

13. The secure network server system as recited in claim 12, said secure network server system being further programmed to perform the following step: subsequent to step (a) and prior to step (b), sending a message from said receiving task group to said forwarding task group indicating that said receiving task group has been created.

14. The secure network server system as recited in claim 12, wherein in response to receipt of a message from said forwarding task group indicating that said connection between said forwarding task group and said destination host has not been established, said receiving task group will not establish a connection with said source host.

* * * * *